United States Patent
Marking et al.

(10) Patent No.: US 6,415,895 B2
(45) Date of Patent: Jul. 9, 2002

(54) POSITION-SENSITIVE SHOCK ABSORBER

(75) Inventors: John Marking, El Cajon; Douglas E. Brewer, Sunnyvale; Robert C. Fox, Jr., Los Gatos, all of CA (US)

(73) Assignee: Fox Factory, Inc., Watsonville, CA (US)

( * ) Notice: Subject to any disclaimer, the term of this patent is extended or adjusted under 35 U.S.C. 154(b) by 0 days.

(21) Appl. No.: 09/916,093

(22) Filed: Jul. 26, 2001

Related U.S. Application Data

(62) Division of application No. 09/422,867, filed on Oct. 21, 1999, now Pat. No. 6,296,092.
(60) Provisional application No. 60/106,028, filed on Oct. 28, 1998, and provisional application No. 60/106,380, filed on Oct. 29, 1998.

(51) Int. Cl.$^7$ .................................................. F16F 9/48
(52) U.S. Cl. ..................................................... 188/287
(58) Field of Search ................................ 188/315, 318, 188/322.15, 322.21, 322.22, 266, 287, 269, 299, 322.5, 322.19; 267/140.14, 140.15; 280/707, 714

(56) References Cited

U.S. PATENT DOCUMENTS

| | | | |
|---|---|---|---|
| 4,132,395 A | 1/1979 | Fox, Jr. ..................... 267/64 R |
| 4,700,611 A | * 10/1987 | Kaneko | |
| 4,971,344 A | 11/1990 | Turner ......................... 280/276 |
| 5,161,653 A | * 11/1992 | Hare | |
| 5,178,239 A | 1/1993 | Homme ....................... 188/315 |
| 5,186,481 A | 2/1993 | Turner ......................... 280/276 |
| 5,456,480 A | 10/1995 | Turner et al. ................ 280/276 |
| 5,580,075 A | 12/1996 | Turner et al. ................ 280/276 |
| 5,588,509 A | 12/1996 | Weitzenhof et al. ......... 188/267 |
| 5,682,966 A | 11/1997 | Cabrerizo-Pariente ...... 188/269 |

* cited by examiner

*Primary Examiner*—Paul N. Dickson
*Assistant Examiner*—C. T. Bartz
(74) *Attorney, Agent, or Firm*—James F. Hann; Haynes Beffel & Wolfeld LLP

(57) ABSTRACT

The present invention is directed to shock absorbers with damping adjusters which vary the damping provided during compression and rebound strokes. The shock absorber includes a cylinder within which a piston is movably mounted for movement within the cylinder. Bypass openings open into the cylinder interior at axially spaced-apart positions. The bypass openings are coupled by a bypass channel. A pressurized gas container is fluidly coupled to the cylinder interior with a movable barrier separating the pressurized gas container and the cylinder interior. Compression and rebound damping adjusters may be used.

9 Claims, 11 Drawing Sheets

POSITION-SENSITIVE SHOCK ABSORBER

CROSS-REFERENCE TO RELATED APPLICATIONS

This is a division of U.S. patent application Ser. No. 09/422,867, filed Oct. 21, 1999, now U.S. Pat. No. 6,296,092, which application claims the benefit of the following provisional patent applications: 60/106,028, filed Oct. 28, 1998 and No. 60/106,380, filed Oct. 29, 1998.

BACKGROUND OF THE INVENTION

Many types of suspensions and supports include a spring and a damping device to help isolate that supported from the support structure or surface. For example, automotive vehicles commonly use separate springs and simple shock absorbers to support the vehicle frame on the axle assemblies. Simple shock absorbers are typically oil-filled cylinders within which a vented piston is mounted. The piston is connected to a shaft which extends out of one end of the cylinder. The outer end of the shaft is mounted to one point on the vehicle and the other end of the cylinder is mounted to another point on the vehicle in parallel with the suspension spring. Thus, simple shock absorbers only provide damping and not support.

Another type of shock absorber, which is the type commonly used with motorcycles, off-road vehicles, competition automotive vehicles and off-road bicycles, combines both the suspension function and the shock absorbing function in one unit. This second type of shock absorber commonly uses a spring unit to provide the suspension function coupled with a damping unit to provide the damping function. Conventional shock absorber designs commonly incorporate an external coil spring, an internal air spring, or an internal bladder to provide the suspension function.

Typical shock absorbers (also referred to as shocks) provide two kinds of damping: compression damping ("CD"), and rebound damping ("RD"). One refers to damping force created during "inward" travel of the shaft (shortening of the shock), the other refers to force created during "outward" travel of the shaft (lengthening of the shock). Generally, but not always—depending on linkage connecting shock to vehicle, RD applies during outward motion and CD applies during inward motion. Some shocks are externally adjustable by the user to provide for RD and/or CD adjustment.

Piston-type shock absorbers can be designed to provide the same amount of damping on both the compression stroke and the rebound stroke. Alternatively, the fluid passageways through the vented, damping piston can be designed so that the restriction to fluid flow through the damping piston during the compression stroke is different than the restriction to fluid flow during the rebound stroke. In this case the damping during the entire compression stroke is different than the damping during the entire rebound stroke.

Another type of damping is called position-sensitive damping. Position-sensitive damping is typically achieved by the combination of conventional vented piston damping, with the oil flowing through the damping piston, plus damping provided by the passage of oil around the damping piston through a bypass chamber or channel, which permits oil to bypass the piston during a portion of the piston stroke. The bypass channel thus permits lesser damping over the portion of the stroke during which some fluid flows around the piston through the bypass channel. Therefore, the shock can have different damping characteristics along different segments of the stroke. This is beneficial to the user because a single set of shocks can provide smooth damping for less aggressive riding and firm damping for aggressive riding without making any adjustments during the ride. For example, the shocks can provide reduced damping in the mid-stroke zone, where the shock is most active in, for example, trail riding or other less aggressive riding. If the rider starts riding more aggressively, or hits a large bump, causing the shock to compress deeper into the stroke, the bypass damping then becomes available and the shock relies on the conventional piston damping. This type of shock absorber has been available for many years. For example, a position-sensitive shock absorber has been sold by Fox Factory, Inc. of San Jose, Calif. since about 1987. U.S. Pat. No. 5,178,239 illustrates another example of a position-sensitive shock absorber. The position-sensitive damping action of the bypass channel is available during both the compression and rebound strokes.

SUMMARY OF THE INVENTION

The present invention is directed to shock absorbers, including position-sensitive shock absorbers in which the position-sensitive damping can be different during compression and rebound strokes, and shock absorbers with damping adjusters which vary the damping provided during compression and rebound strokes.

The position-sensitive shock absorber includes a cylinder within which a piston is movably mounted for movement between the first and second ends of the cylinder. First and second bypass openings open into the cylinder interior at axially spaced-apart positions. The bypass openings are coupled by a bypass channel. A flow valve is positioned along the bypass channel permitting fluid flow from the first opening to the second opening and restricting fluid flow from the second opening to the first opening. The first bypass opening may be selectively sealed by, for example, a movable closing member which is used to selectively cover or uncover the bypass opening. This selective sealing can be through the use of electromagnetic energy. Alternatively, the closing member can be biased to either cover or uncover the opening, the closing member overcoming the biasing force when a shock absorber is accelerated to an appropriate degree. The flow valve may also be a check valve.

Another aspect of the invention is directed to a position-sensitive shock absorber with a piston movably mounted within the cylinder for movement between the first and second ends of the cylinder. First and second bypass openings, coupled by a bypass channel, open into the cylinder interior. A pressurized gas container is fluidly coupled to the cylinder interior. A movable barrier separates the pressurized gas container from the cylinder interior. A shaft, having an inner end secured to the piston and an outer end extending out past the first end of the cylinder, is sealed by a shaft seal assembly. A spring element couples the shaft and the cylinder. This invention is also directed to a method for modifying the front forks in which any existing shock-absorbing components are removed from within the telescoping front forks of a wheeled vehicle and the above-described position-sensitive shock absorber is mounted within each telescoping front fork.

A further aspect of the invention is directed to a shock absorber including a cylinder with a piston movably mounted within the cylinder. A pressurized gas container is fluidly coupled to the cylinder interior and a movable barrier separates the pressurized gas container and the cylinder interior. A shaft has an inner end secured to the piston and an outer extending out past the first end of the cylinder. This shock absorber includes one or both of the following compression damping adjuster and/or rebound damping adjuster. The compressing damping adjuster includes a flow controller having a first path permitting substantially free fluid flow in a rebound direction from the movable barrier towards the piston and second flow path for fluid flow in a compression direction. The compression damping adjuster also includes an adjustable position flow restrictor situated along the second flow path to adjust the restriction to fluid flow in the damping direction. The rebound damping adjuster includes a rebound flow path through the piston and a rebound flow-restricting element movable to vary the restriction to rebound fluid flow along the rebound flow path. The shaft is a hollow shaft and the rebound flow-restricting element includes a rod housed within the hollow shaft. A rod position adjuster is mounted to the shaft and engages the rod so to adjust the axial position of the rod along the hollow shaft.

Other features and advantages of the invention will appear from the following description in which the preferred embodiments have been set forth in detail in conjunction with the accompanying drawings.

DESCRIPTION OF THE PREFERRED EMBODIMENTS

Figure 1:
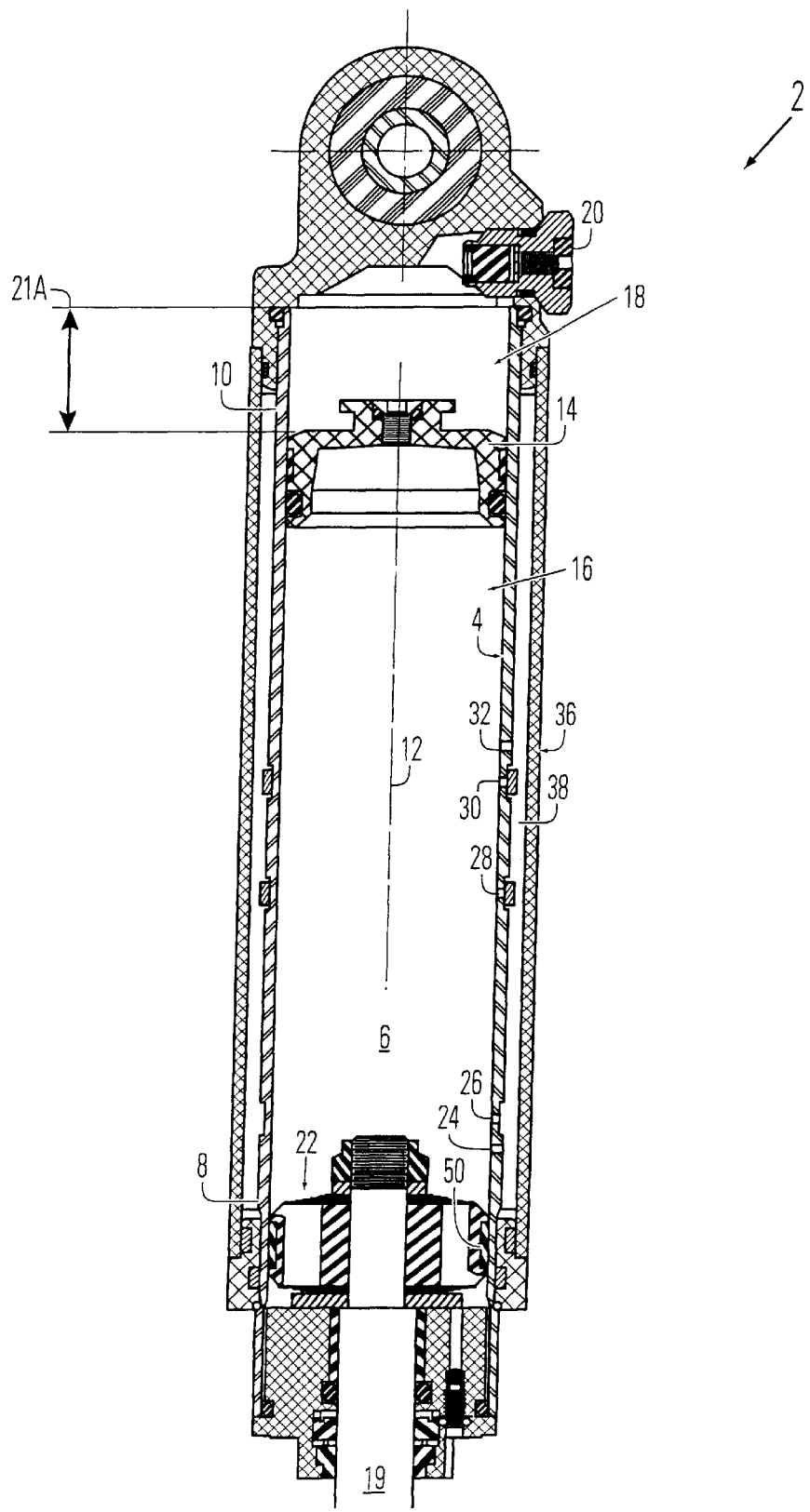
FIG. 1 is a side cross-sectional view of a position-sensitive shock absorber made according to the invention with the piston in a rest position prior to beginning the compression stroke.

FIGS. 1–5 illustrate one aspect of the present invention directed to a position-sensitive shock absorber 2 including a cylinder 4 having an interior 6, first and second ends 8, 10 and defining an axis 12. A floating piston 14 divides interior 6 into a damping fluid chamber 16 and a gas chamber 18. Gas chamber 18 can be pressurized through a pressurization port 20. Gas chamber 18 and floating piston 14 accommodate the volume of oil or other damping fluid within chamber 16 displaced by the movement of shaft 19 into chamber 16. The compression of the gas within gas chamber 18 is suggested by arrows 21A–21D in FIGS. 1–4.

A vented piston 22 is movably mounted within the cylinder for moving between the first and second ends of the cylinder. A number of axially separated bypass openings 24, 26, 28, 30, 32 are formed through the cylinder. A bypass cylinder 36 surrounds cylinder 4 and defines a cylindrical bypass channel 38. Bypass openings 24, 26 and 32 are always open and fluidly couple the damping fluid chamber and the bypass channel to permit some damping fluid to bypass the vented damping piston 22 when the piston is positioned between these bypass openings thus reducing the damping during this portion of the stroke. See FIG. 2. Bypass openings 28, 30 are covered by expandable bands 40, 42 positioned within annular grooves 44, 46 formed in the outer surface of cylinder 4. See also FIG. 5. Bands 40, 42 act as check valve elements which permit fluid flow from the damping fluid chamber to the bypass channel but restricts, and typically prevents, fluid flow in the opposite direction. Thus, the shock absorber will exhibit different damping characteristics along the same segment of the stroke depending upon whether the stroke is the compression stroke or the rebound stroke.

Figure 2:
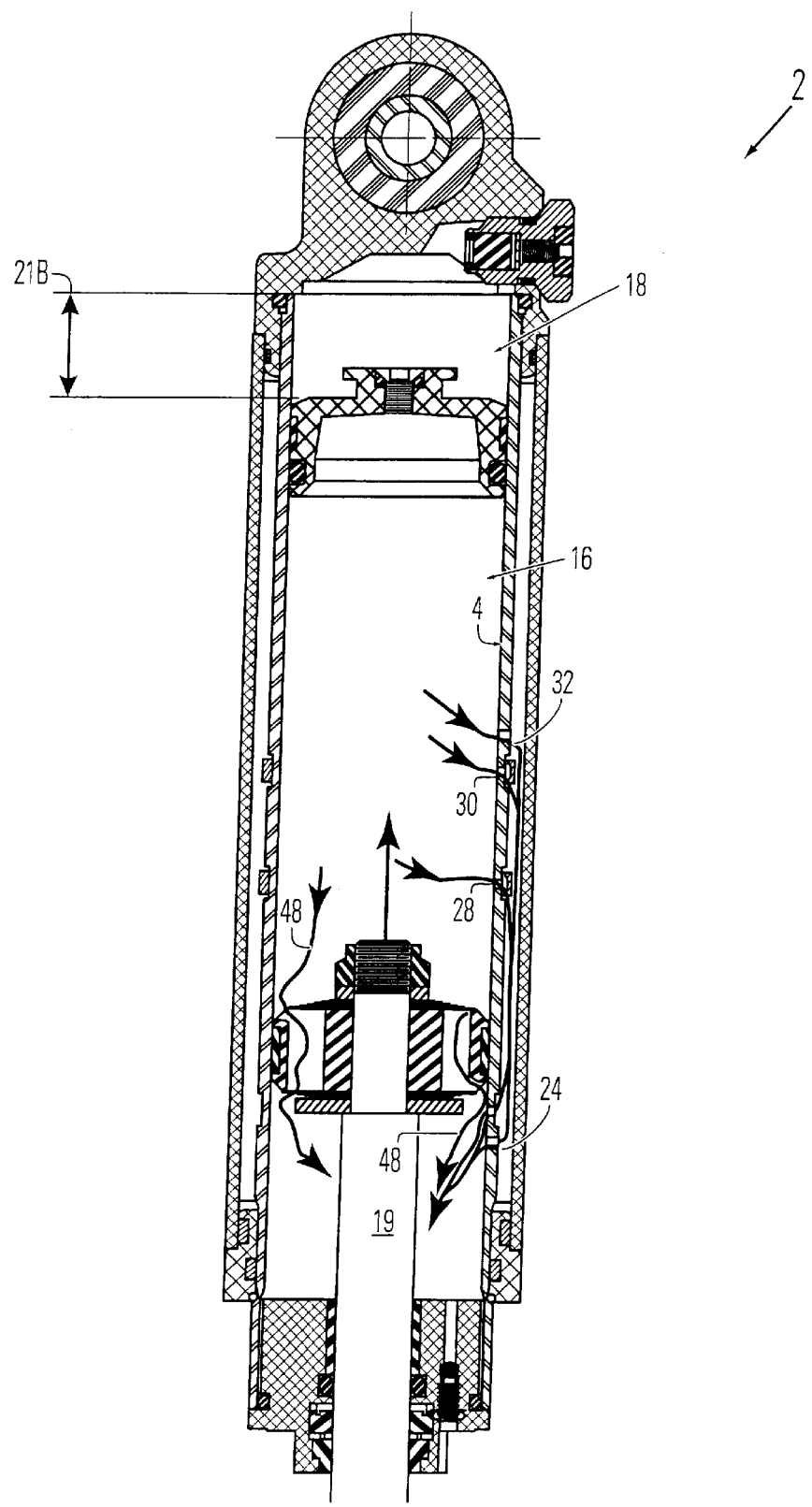
FIG. 2 shows the shock absorber of FIG. 1 at the beginning of a compression stroke.

FIG. 1 illustrates damping piston 34 at rest adjacent the first end of the cylinder. The movement of the damping piston upwardly, that is in the compression stroke, is dampened only by the flow of damping fluid through the damping piston (see arrows 48 in FIG. 2) until the damping piston seal 50, which contacts and seals against the interior of cylinder 4, passes bypass opening 24. When this occurs fluid flow can be both through damping piston 34 via arrows 48 and also can bypass the damping piston through bypass openings 28, 30, 32, along bypass channel 38 and back through bypass openings 24, 26 as illustrated in FIG. 2. This 3/2 zone (flow through 3 and 2 bypass openings on either side of the piston) provides the softest (least damped) zone of the compression stroke.

Figure 3:
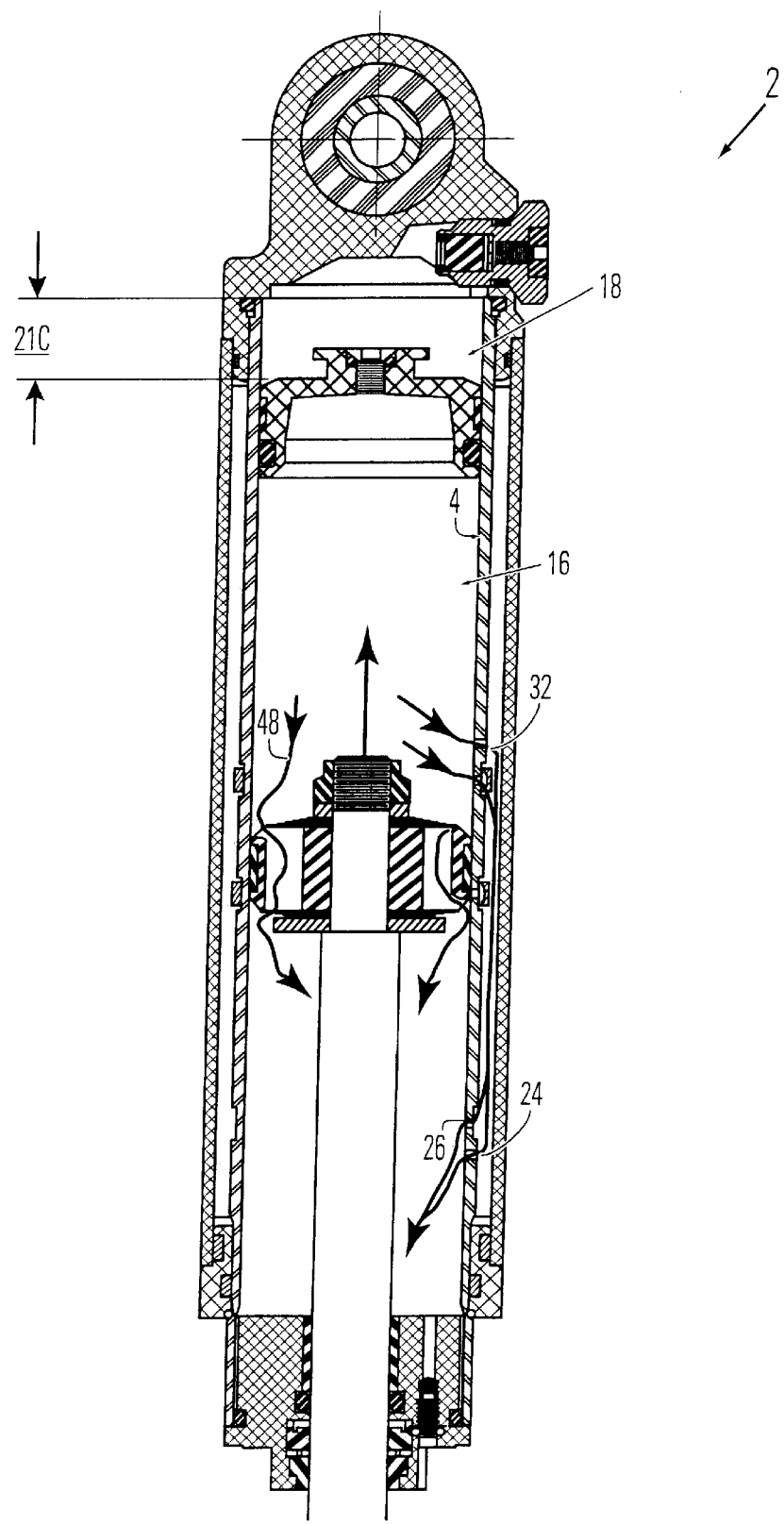
FIG. 3 shows the shock absorber of FIG. 2 further along the compression stroke.
Figure 4:
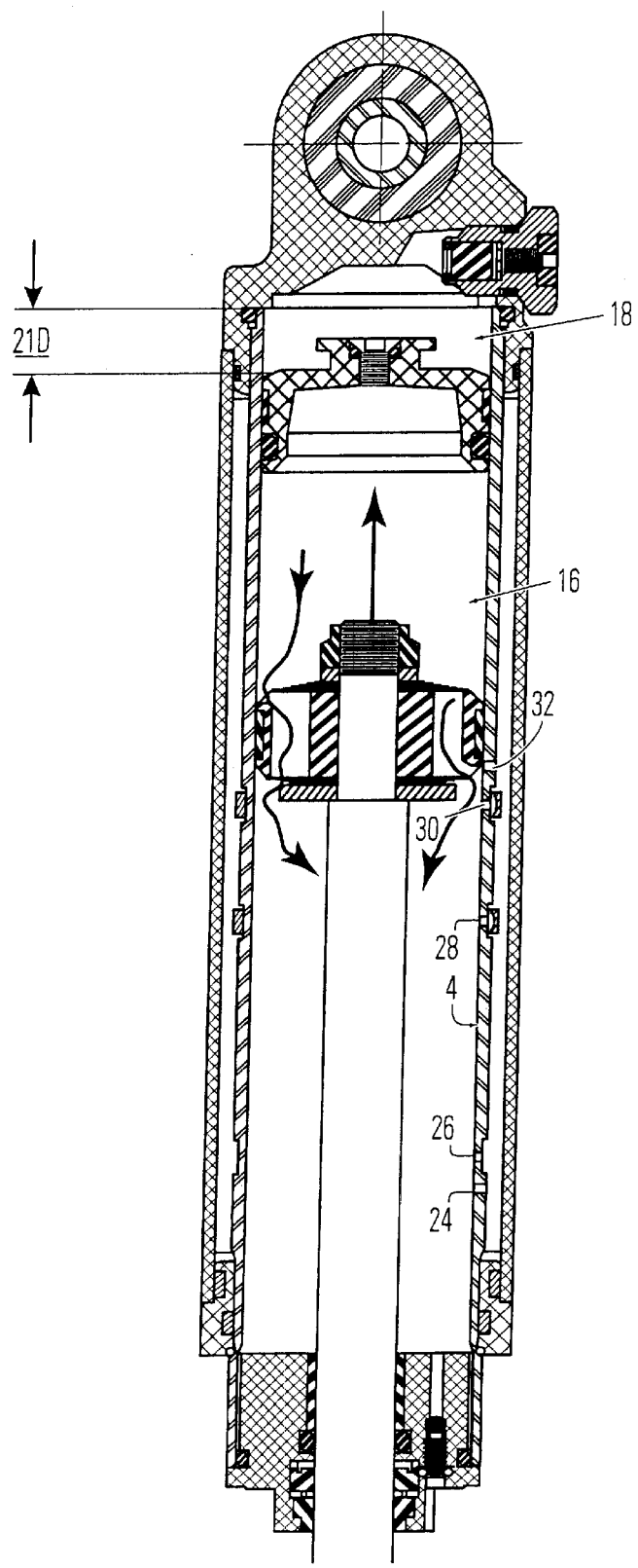
FIG. 4 illustrates the shock absorber of FIG. 3 as it approaches the end of its compression stroke.

The next zone of the compression stroke is created when piston seal 50 covers bypass opening 28 as shown in FIG. 3. This 2/2 zone of the compression stroke is still soft but not as soft as that of FIG. 2. The 2/2 zone of FIG. 3 continues until bypass opening 30 is covered by piston seal 50. This creates a short 1/2 zone (not illustrated) until piston seal 50 covers bypass opening 32. Continued compression stroke movement, see FIG. 4, results in a 0/0 zone—that is no fluid bypasses the damping piston.

The rebound stroke, not shown, exhibits no bypass fluid flow (a 0/0 zone) until seal 50 passes bypass opening 32. At this point fluid flow is out through bypass openings 24, 26, 28 (30 being covered by seal 50) and back in through bypass opening 32 for a 3/1 zone. After seal 50 passes bypass opening 30, the bypass zone remains 3/1 because fluid cannot flow from bypass channel 38 through opening 30. Once seal 50 covers opening 28, the bypass zone is a 2/1 zone until seal 50 covers opening 26. With opening 26 covered but opening 24 open, the fluid can pass through openings 24 and 32 only, a 1/1 zone. Once seal 50 covers opening 24 no bypass occurs, a 0/0 zone.

Thus, it is seen that the amount of damping fluid bypass varies along both the compression and rebound strokes and may be different along the same segments of the cylinder on the compression and rebound strokes.

Bands 40, 42 can be made of spring metal, elastomeric material or other suitable expandable material. Instead of a band of material, bands 40, 42 could be replaced by individual flaps of material. More than one bypass opening 24–32 could be provided at the corresponding axial position with a single band type check valve servicing the additional holes. An additional option is to add more holes axially, with or without check valves, to provide more specific zones. Conceptually, the damping piston could be non-vented (solid) with all of the damping fluid channeled through the bypass holes. The location, radial quantity, axial quantity, size, check valve location and check valve stiffness would define the damping tuning elements. While the check valves created at openings 28, 30 may be substantially leak-proof, they may permit some amount of leakage even when nominally closed. Additionally, the stiffness of the check valve material can be tailored to alter the amount of damping achieved by the valve in the open or semi-open state. A relatively stiffer material will provide more damping associated with the related bypass hole. The purpose is to provide an additional damping tuning feature, thus providing a means for optimal damping calibration.

In some situations it may be desired to add additional check valves to reduce or even prevent bypass flow. By installing an additional check valve in the groove at 26, rebound and compression flow in all of the bypass zones is effectively reduced to a 1/1 zone. Installing bands at the remaining bypass holes 24 and 32 eliminates all bypass flow paths, a 0/0 zone.

It may be desired to permit user adjustment of bypass damping. One way to do so is to permit bypass cylinder 36 to rotate and/or reciprocate relative to cylinder 4. This movement would cause bypass opening seals and one-way valve elements to selectively cover and uncover various bypass openings. This would permit some or all of the bypass openings to be completely sealed, left completely open or provided with a check valve. The check valves could, as described below with reference to FIGS. 5A and 5B, be remotely adjusted through the use of solenoid valves. The solenoid valve would be used to restrict the available movement of the check valve. This can be done proportionally or bi-modally.

The check valve can be a semicircular spring band fixed to the body 4 at one end and covering the bypass hole at the other end. By changing the effective stiffness of the spring element (shorter is proportionally stiffer) the damping effect associated with the check valve/bypass hole can be altered upon assembly or using a rotating, reciprocation, or solenoid scheme as described above.

Figure 5:
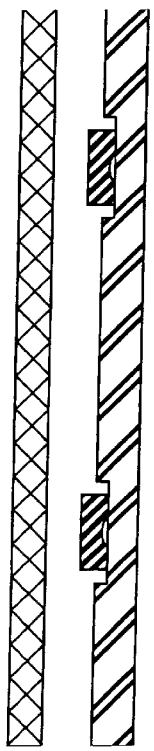
FIG. 5 is an enlarged cross-sectional view of a central portion of the cylinder and bypass cylinder of the shock absorber of FIG. 1 illustrating the expandable bands acting as check valves covering two different bypass openings.
Figure 5:
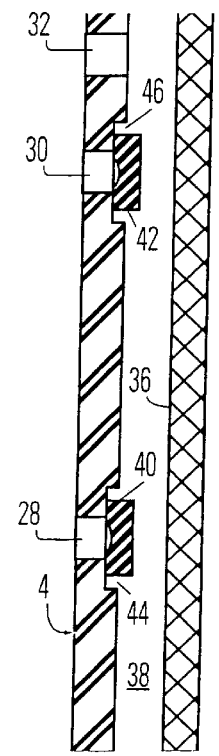
Figure 5A:
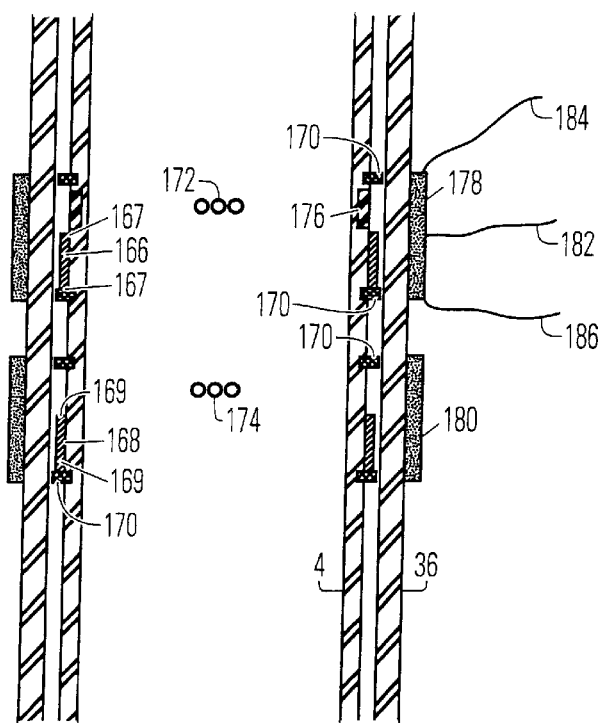
FIG. 5A illustrates an alternative embodiment of the structure of FIG. 5 in which rings are positioned within the bypass channel to cover or uncover bypass openings under the influence of a pair of electromagnetic coils, both of the sets of bypass openings being uncovered.
Figure 5B:
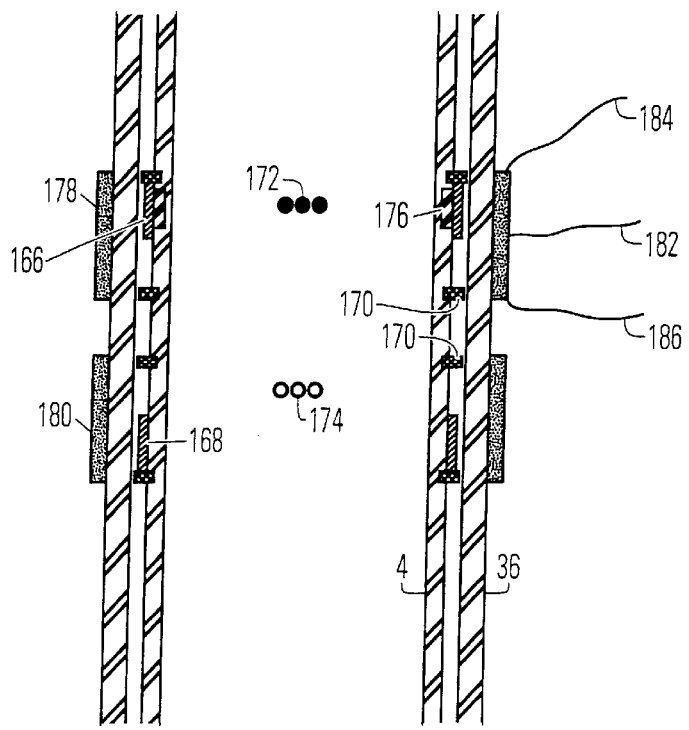
FIG. 5B illustrates the structure of FIG. 5A with one of the sets of bypass openings covered and one uncovered.

FIGS. 5A and 5B illustrate the use of a pair of axially-slidable rings 166, 168 positioned between pairs of snap rings 170, the snap rings lying on either side of bypass opening 172, 174. FIG. 5A illustrates both openings 172, 174 being uncovered while FIG. 5B shows openings 172 covered and openings 174 uncovered. Bypass openings 172 are surrounded by an expandable band 176. The regions between each pair of snap rings 170 are surrounded by center tap coils 178, 180; each coil has a common ground 182 and a pair of leads 184, 186, the ground and leads for coil 180 not being shown in FIGS. 5A and 5B. Rings 166, 168 are made of a ferromagnetic material so they can be attracted by a magnetic field. Selectively energizing the appropriate lead 184, 186, which can be done manually or automatically, creates a magnetic field and causes the associated ring 166, 168 to shift axial position to cover, and thus at least substantially seal, or uncover openings 172, 174. Small magnets 167, 169 are mounted to either end of rings 166, 168; magnetic attraction between magnets 167, 169 and snap rings 170 keep rings 166, 168 in place until coils 178 are again energized.

Figure 5C:
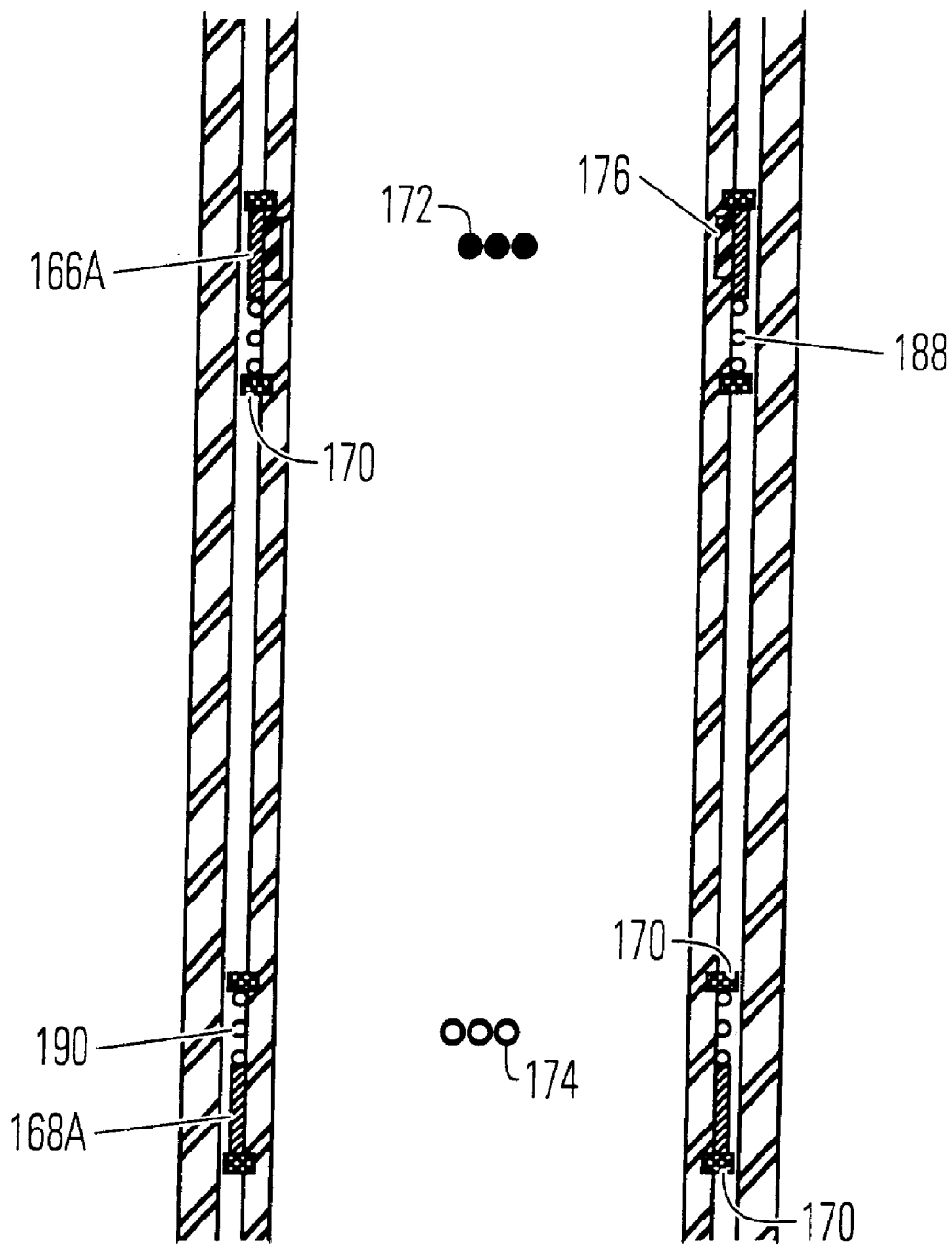
FIG. 5C shows a further alternative embodiment of the structure of FIG. 5A in which the rings are spring-biased to either cover or uncover the bypass openings so that only upon sufficient acceleration of the shock will the ring deflect the spring sufficiently to either cover or uncover the associated bypass openings.

FIG. 5C illustrates an embodiment similar to that of FIGS. 5A and 5B with like components referred to with like reference numerals. Rings 166A, 168A do not have magnets 167, 169, but are lightly biased by springs 188, 190 to cover openings 172 and uncover openings 174 as shown in FIG. 5C. The axial component of acceleration induces rings 166A, 168A to compress springs 188, 190 via F=MA, thus, allowing the ring valve to expose or obstruct bypass openings 172, 174. In this way the position-sensitive feature can be tuned to have an acceleration activation component. The feature can be used to increase or decrease compression damping associated with the vehicle's chassis response to a bump. Instead of compression springs 188, 190, rings 166A, 168A could be or include magnets, which would oppose like poles of magnets carried by cylinder 4, to bias the rings to covering or uncovering positions.

Figure 6:
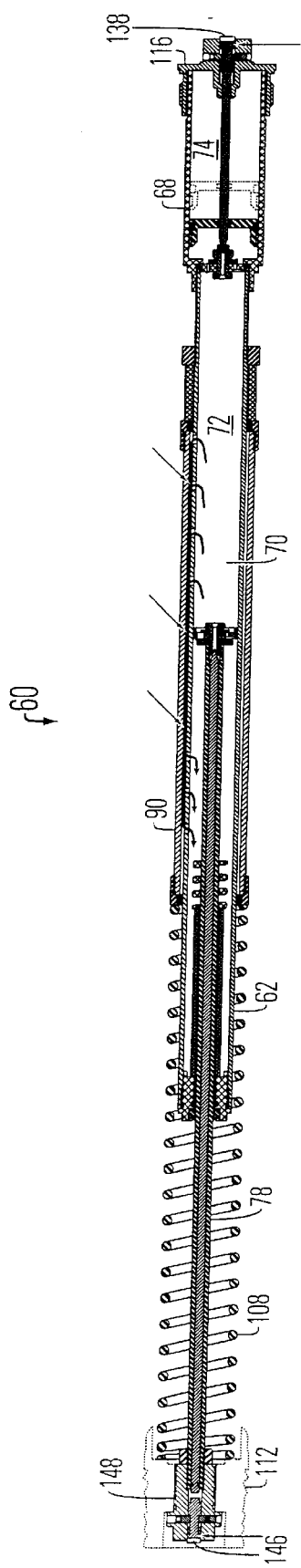
FIG. 6 is overall view of a suspension-type shock absorber.
Figure 7:
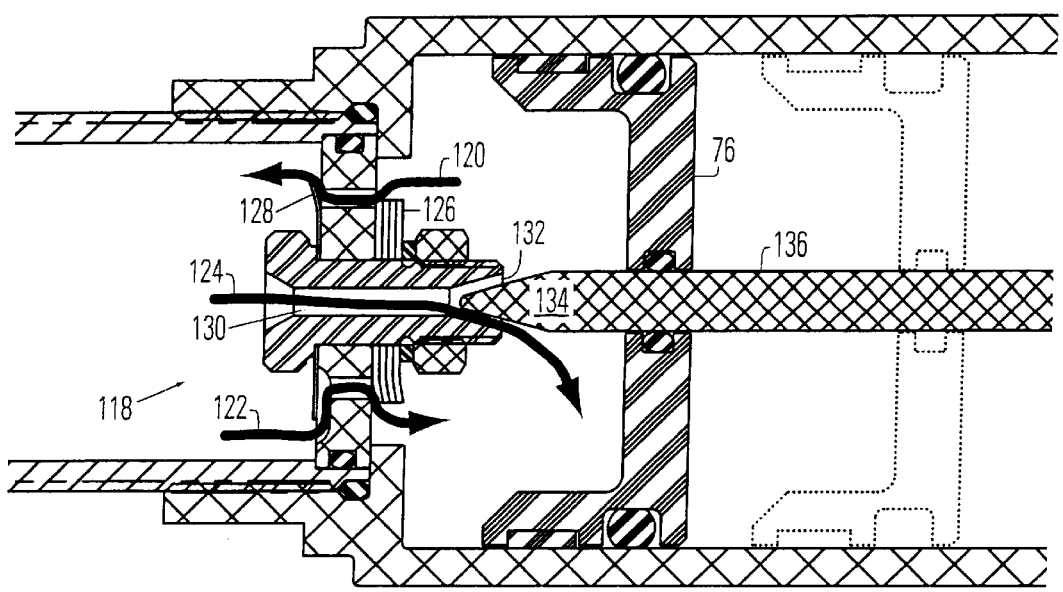
FIG. 7 is an enlarged view of the flow controller of FIG. 6C.
Figure 8:
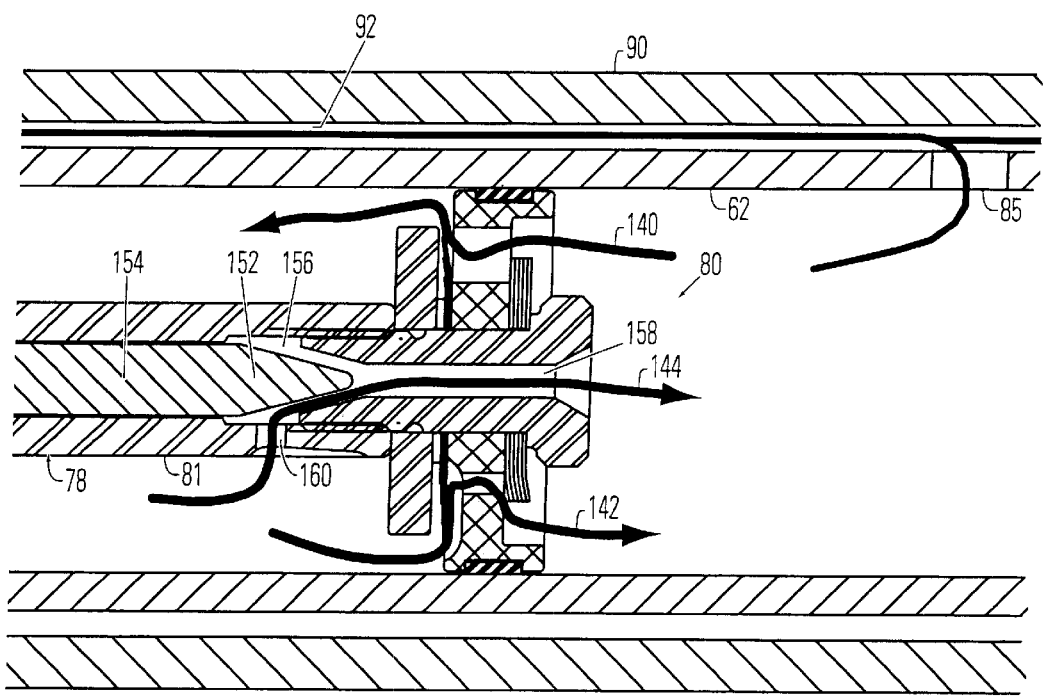
FIG. 8 is an enlarged view of the vented piston of FIG. 6B.

Another aspect of the invention relates to a shock absorber 60 shown in FIGS. 6–8. Shock absorber 60 is a suspension-type shock absorber particularly useful for supplying the suspension and shock absorbing functions of the front forks of motorcycles, mountain bikes and similar wheeled vehicles. While shock absorber 60 could be used as part of the original equipment for the front forks, it is also adapted for retrofit applications. In retrofit applications the user would remove existing shock absorbers from within the front forks, leaving the telescoping tubular fork housings. The shock absorber made according to the invention could be installed within the tubular fork housings as a sealed unit.

Shock absorber 60 includes a cylinder 62 having a first end 64 and a second end 66. A cylinder extension 68 extends from second end 66. The combination of cylinder 62 and cylinder extension 68 defines a cylinder interior 70. Cylinder interior 70 is divided between a damping fluid chamber 72 and a pressurized gas chamber 74 by a floating piston 76. Gas chamber 74 can be precharged with a pressurized gas, typically nitrogen, or can be charged through a pressurization port, not shown. Pressurized gas chamber 74 and floating piston 76 accommodates the volume of oil or other damping fluid within chamber 72 displaced by the movement of a shaft 78 into and out of chamber 72.

A vented piston 80 is secured to the inner end 81 of shaft 78 for movement within cylinder 62. A number of axially separated bypass openings 82–88 are formed through cylinder 62. This portion of cylinder 62 is surrounded by a bypass cylinder 90 which defines a cylindrical bypass channel 92 between cylinders 62, 90. The arrows shown in FIG. 6 illustrate the flow through the bypass channels during a compression stroke, that is with piston 80 moving towards floating piston 76. As suggested in FIG. 8, fluid flow through vented piston 80 can also occur during both the compression and rebound strokes. The variation and the flow through the various bypass openings as piston 80 covers up and passes each of the openings 82–88 is similar to that discussed above with regard to shock absorber 2 and thus will not be discussed in detail. Shock absorber 80 does not show the use of check valves or other flow control valves to restrict flow between the bypass openings along bypass channel 92. However, such flow control valves could be used with the embodiment of FIGS. 6–8 just as they are used with they embodiment of FIGS. 1–5C.

The position of bypass cylinder 90 along cylinder 62 can be changed by adjusting a threaded ring 94 which engages threads 96 as second end 66 of cylinder 62. A spacer sleeve 98 is used between threaded ring 94 and the second end 100 of bypass cylinder 90.

Shaft 78 passes through a shaft seal assembly 102 at a first end 64 of cylinder 62. A spacer sleeve 104 is mounted about shaft 78 is captured between shaft seal assembly 102 and a rebound spring 106. Rebound spring 106 helps to dampen the impact of excessive rebounding of the shock by cushioning the impact of piston 80 against shaft seal assembly 102.

A coil spring 108 is captured between the first end 110 of bypass cylinder 90 and one end 112, shown in dashed lines, of, for example, the front forks of a motorcycle or other wheeled vehicle. The distal end 114 of cylinder extension 68 is sealed by a threaded cap 116 which is typically threaded to the upper end of the vehicle's tubular fork housing.

In addition to the damping through vented piston 80 and the position-sensitive damping provided by bypass openings 82–88, shock absorber 60 permits the user to adjust both compression damping and rebound damping over the entire stroke in compression and rebound. FIG. 7 is an enlarged illustration showing a flow controller 118 at second end 66 of cylinder 62. Flow controller 118 provides for relatively free fluid flow along a rebound stroke flow path 120 during the rebound stroke, that is with piston 80 moving away from piston 76 in this embodiment. However, during compression fluid flow can pass through flow controller 118 along two different compression stroke flow paths 122, 124. Flow along path 122 is substantially restricted by the use of several washers 126 as opposed to the single, easily flexed washer 128. The fluid flow through flow controller 118 is determined by the volume of shaft 78 being extended into and retracted from damping fluid chamber 72, which is filled with an incompressible fluid, typically oil. The damping created by flow controller 118 is constant throughout the entire compression stroke. Flow controller 118 also includes a central passageway 130 having a tapered opening 132 which can be fully or partially obstructed by the flow restricting tip 134 of an adjustment rod 136. An adjustment screw 138 mounted to threaded cap 116 is used to adjust the axial position of rod 136 and thus the size of the opening formed between tapered opening 132 and tip 134.

FIG. 8 illustrates fluid flows through vented piston 80 during both compression and rebound strokes. The fluid flows through piston 80 during the compression stroke is indicated by compression flow path 140 while the flow during the rebound stroke and indicated by rebound flow paths 142, 144. The restriction along rebound flow path 144 is adjustable by the user. This is achieved by rotating a rebound damping adjustment screw 146 threadably mounted to an outer end mounting adapter 148 which is secured to the outer end 150 of shaft 78, typically by threads. Adjusting the axial position of screw 146 causes the flow restricting tip 152 of a rebound damping adjustment rod 154 to be moved into and out of the tapered opening 156 at one end of a fluid passageway 158 formed through the center of piston 80. As can be seen in FIG. 8, supplemental rebound flow path 144 passes through a bleed hole 160 formed in shaft 78, passes along the channel formed between tip 152 and tapered opening 156 and out of fluid passageway 158.

Figure 6A:
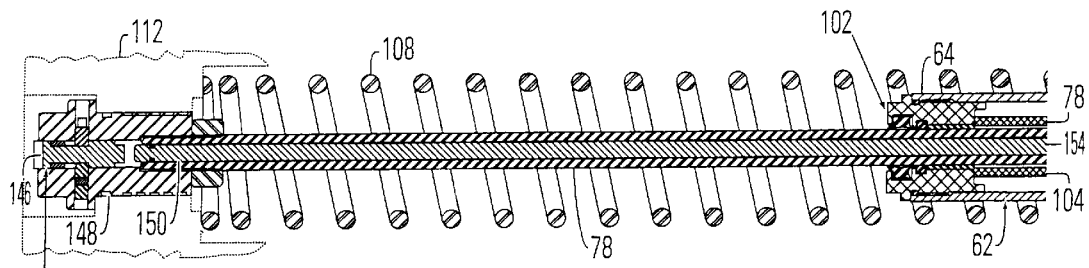
FIGS. 6A–6C are enlarged cross-sectional views of the left-hand, middle and right-hand portions of the shock absorber of FIG. 6.
Figure 6B:
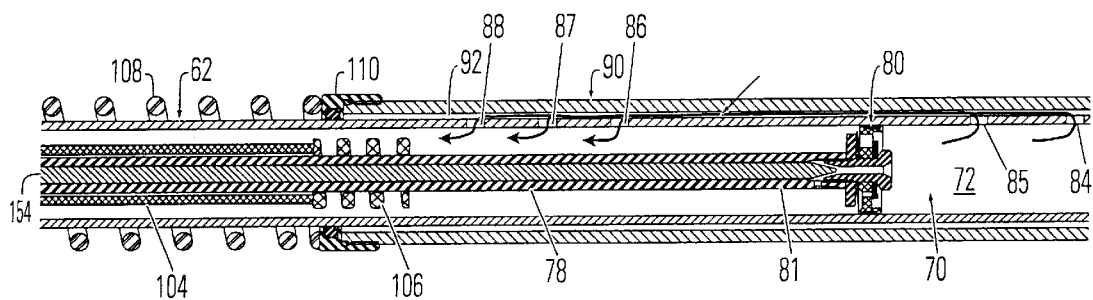
Figure 6C:
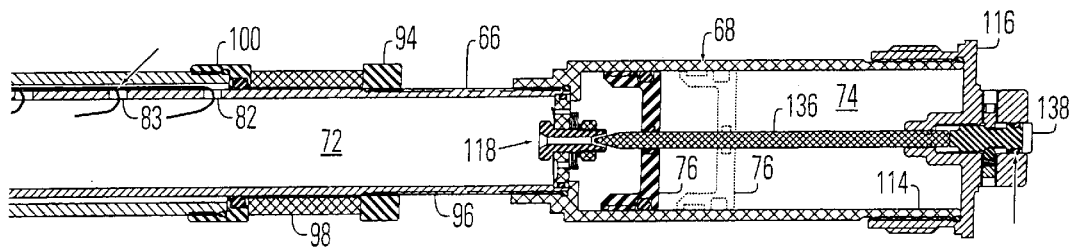

During rebound, floating piston 76 will move from the dashed line position to the solid line position of FIGS. 6 and 7. The friction created between floating piston 76 and adjustment rod 136 will cause flow restricting tip 134 of rod 136 to be moved to the left in FIG. 7 thus effectively sealing tapered opening 132. In FIG. 6A there is a gap between the outer end of rod 154 and adjustment screw 146. In practice the pressurization within gas chamber 74 will tend to force rod 154 to the left in FIG. 6 thus causing the outer end of the rod to engage adjustment screw 146. Therefore, rebound flow path 144 remains open during compression as well as rebound. However, provision of path 144 has a pronounced effect on rebound damping but has little effect on compression damping because of the significantly different flow rates between the two. That is the reason why flow path 144 is considered a rebound flow path.

In the embodiment of FIGS. 6–8 pressurized gas chamber 74 is shown aligned with and an extension of cylinder 62. If desired it could be positioned in other areas and could be fluidly coupled through a flexible tube instead of a rigid connection. Also, floating piston 76 could be replaced by a diaphragm, bellows or other fluid force-transmitting barrier.

Any and all patents, applications, and printed publications referred to above are incorporated by reference.

What is claimed is:

1. A position-sensitive shock absorber comprising:
    a cylinder having an interior, first and second ends and defining an axis;
    a piston movably mounted within the cylinder for movement between first and second locations within the cylinder;
    first and second bypass openings opening into the cylinder interior at first and second axially spaced-apart positions;
    a bypass channel fluidly coupling the first and second bypass openings;
    a pressurized gas container fluidly coupled to the cylinder interior;
    a movable barrier separating the pressurized gas container and the cylinder interior;
    a shaft having an inner end secured to the piston and an outer end extending out past the first end of the cylinder;
    a shaft seal assembly fluidly sealing the axially-movable shaft and the first end of the cylinder; and
    a spring support element continuously coupling the shaft and the cylinder as the piston moves between the first and second locations.

2. The shock absorber according to claim 1 wherein the piston is a vented piston.

3. The shock absorber according to claim 1 wherein the cylinder comprises first and second cylindrical members defining said bypass channel therebetween, and further comprising a flow valve along the bypass channel permitting fluid flow from the first opening to the second opening and restricting fluid flow from the second opening to the first opening.

4. The shock absorber according to claim 3 wherein the flow valve is a check valve, including a movable check valve element, preventing any substantial fluid flow from the second opening to the first opening.

5. A position-sensitive shock absorber comprising:
    a cylinder having an interior, first and second ends and defining an axis;
    a piston movably mounted within the cylinder for movement between the first and second ends;
    first and second bypass openings opening into the cylinder interior at first and second axially spaced-apart positions;
    a bypass channel fluidly coupling the first and second bypass openings;

a pressurized gas container fluidly coupled to the cylinder interior;

a movable barrier separating the pressurized gas container and the cylinder interior;

a shaft having an inner end secured to the piston and an outer end extending out past the first end of the cylinder;

a compression damping adjuster comprising:
  a flow controller situated between the piston and the movable barrier, the flow controller having a first flow path permitting substantially free fluid flow in a rebound direction from the movable barrier towards the piston, the flow controller having a second flow path for fluid flow in a compression direction; and
  an adjustable position flow restrictor situated along the second flow path to adjust the restriction to fluid flow in the damping direction;

a rebound damping adjuster, the rebound damping adjuster comprising:
  a rebound flow path through the piston and a rebound flow restricting element movable to vary the restriction to rebound fluid flow along the rebound flow path;

wherein the shaft is a hollow shaft and the rebound flow restricting element comprises:
  a rod housed within the hollow shaft, the rod having an inner end at the rebound flow path and an outer end; and
  a rod position adjuster mounted to the shaft and engaging the rod so to adjust the axial position of the rod along the hollow shaft;

a shaft seal assembly fluidly sealing the axially-movable shaft and the first end of the cylinder; and a spring element coupling the shaft and the cylinder.

6. A shock absorber comprising:

a cylinder having an interior, first and second ends and defining an axis;

a piston movably mounted within the cylinder for movement between the first and second ends;

a pressurized gas container fluidly coupled to the cylinder interior;

a movable barrier separating the pressurized gas container and the cylinder interior;

a shaft having an inner end secured to the piston and an outer end extending out past the first end of the cylinder; and a compression damping adjuster comprising:
  a flow controller situated between the piston and the movable barrier, the flow controller having a first flow path permitting substantially free fluid flow in a rebound direction from the movable barrier towards the piston, the flow controller having a second flow path for fluid flow in a compression direction; and
  an adjustable position flow restrictor situated along the second flow path to adjust the restriction to fluid flow in the damping direction.

7. A shock absorber comprising:

a cylinder having an interior, first and second ends and defining an axis;

a piston movably mounted within the cylinder for movement between the first and second ends;

a pressurized gas container fluidly coupled to the cylinder interior;

a movable barrier separating the pressurized gas container and the cylinder interior;

a shaft having an inner end secured to the piston and an outer end extending out past the first end of the cylinder; and a rebound damping adjuster, the rebound damping adjuster comprising:
  a rebound flow path through the piston and a rebound flow restricting element movable to vary the restriction to rebound fluid flow along the rebound flow path; wherein the shaft is a hollow shaft and the rebound flow restricting element comprises:
  a rod housed within the hollow shaft, the rod having an inner end at the rebound flow path and an outer end; and
  a rod position adjuster mounted to the shaft and engaging the rod so to adjust the axial position of the rod along the hollow shaft.

8. A shock absorber comprising:

a cylinder having an interior, first and second ends and defining an axis;

a piston movably mounted within the cylinder for movement between the first and second ends;

a pressurized gas container fluidly coupled to the cylinder interior;

a movable barrier separating the pressurized gas container and the cylinder interior;

a shaft having an inner end secured to the piston and an outer end extending out past the first end of the cylinder;

a compression damping adjuster comprising:
  a flow controller situated between the piston and the movable barrier, the flow controller having a first flow path permitting substantially free fluid flow in a rebound direction from the movable barrier towards the piston, the flow controller having a second flow path for fluid flow in a compression direction; and
  an adjustable position flow restrictor situated along the second flow path to adjust the restriction to fluid flow in the damping direction;

a rebound damping adjuster, the rebound damping adjuster comprising:
  a rebound flow path through the piston and a rebound flow restricting element movable to vary the restriction to rebound fluid flow along the rebound flow path;

wherein the shaft is a hollow shaft and the rebound flow restricting element comprises:
  a rod housed within the hollow shaft, the rod having an inner end at the rebound flow path and an outer end; and
  a rod position adjuster mounted to the shaft and engaging the rod so to adjust the axial position of the rod along the hollow shaft.

9. A method for modifying the front forks of a wheeled vehicle comprising:

selecting a position-sensitive shock absorber comprising:
  a cylinder having an interior, first and second ends and defining an axis;
  a piston movably mounted within the cylinder for movement between the first and second ends;
  a pressurized gas container fluidly coupled to the cylinder interior;
  a movable barrier separating the pressurized gas container and the cylinder interior;
  a shaft having an inner end secured to the piston and an outer end extending out past the first end of the cylinder; and a rebound damping adjuster, the rebound damping adjuster comprising:
  a rebound flow path through the piston and a rebound flow restricting element movable to vary the restriction to rebound fluid flow along the rebound flow path;
wherein the shaft is a hollow shaft and the rebound flow restricting element comprises:
  a rod housed within the hollow shaft, the rod having an inner end at the rebound flow path and an outer end; and
  a rod position adjuster mounted to the shaft and engaging the rod so to adjust the axial position of the rod along the hollow shaft;

removing any existing shock-absorbing components from within the telescoping front forks of a wheeled vehicle, the front forks being telescopic tubular members; and mounting said position-sensitive shock absorber within each telescopic front fork.

* * * * *